(12) United States Patent
Lefebvre et al.

(10) Patent No.: US 11,130,180 B1
(45) Date of Patent: Sep. 28, 2021

(54) ADJUSTABLE ORBITAL LATHE

(71) Applicant: L5R LLC, Denver, CO (US)

(72) Inventors: Richard M. Lefebvre, Denver, CO (US); Nathan R. T. Barry, Omaha, NE (US); Michael J. Bartosh, Ocoee, FL (US); Ron Bordage, New Brunswick (CA)

(73) Assignee: L5R LLC, Denver, CO (US)

( * ) Notice: Subject to any disclaimer, the term of this patent is extended or adjusted under 35 U.S.C. 154(b) by 32 days.

(21) Appl. No.: 16/394,585

(22) Filed: Apr. 25, 2019

(51) Int. Cl.
*B23B 3/26* (2006.01)

(52) U.S. Cl.
CPC ...................... *B23B 3/26* (2013.01)

(58) Field of Classification Search
CPC ... Y10T 82/2522; Y10T 82/2527; B23B 3/26; B62D 53/0842
See application file for complete search history.

(56) References Cited

U.S. PATENT DOCUMENTS

| | | | |
|---|---|---|---|
| 5,125,299 A * | 6/1992 | Strait | B23C 3/051 |
| | | | 408/83.5 |
| 6,085,623 A | 7/2000 | Lefebvre | |
| 7,762,167 B2 * | 7/2010 | Lefebvre | B62D 53/0842 |
| | | | 280/433 |
| 2010/0064755 A1 * | 3/2010 | Koller | B21H 5/022 |
| | | | 72/252.5 |

* cited by examiner

*Primary Examiner* — Sara Addisu
(74) *Attorney, Agent, or Firm* — Terry M. Sanks, Esq.; Beusse Sanks, PLLC (57) ABSTRACT

An orbital lathe for in situ resurfacing a fifth wheel kingpin, having a pin axis, where the orbital lathe includes a support column generally axially aligned with the pin axis of the kingpin, a cutting tool mounted to the support column for rotation about the pin axis and having a first positioning mechanism for moving the cutting tool at least radially relative to the pin axis, a second positioning mechanism for rotating the cutting tool about a centerline axis generally orthogonal to the pin axis, and a third positioning mechanism for moving the cutting tool parallel to the centerline axis, and a drive mechanism for rotating the cutting tool about the pin axis to cause the cutting tool to remove material from the kingpin. The position of the cutting tool in relation to the centerline axis determines a surface roughness of the kingpin. Another embodiment of the orbital lathe and a method are also disclosed.

19 Claims, 7 Drawing Sheets

ADJUSTABLE ORBITAL LATHE

BACKGROUND

Embodiments relate to portable lathes and, in particular, to orbital lathes for the in-situ machining of fifth wheel kingpins.

A trailer in a tractor-trailer combination is connected to the "fifth wheel" of a tractor by a fifth wheel kingpin. Through continued use, the kingpin will wear resulting in a decreased diameter and a consequent diminishment of the security of the connection between the tractor and the trailer.

One method of restoring the diameter of a fifth wheel kingpin is to build it up by depositing new metal on the surface of the kingpin and subsequently machining the build-up kingpin down to its operational size. Although this could be done by first removing the kingpin from the trailer, in order to minimize downtime, it is preferable to build-up and machine the kingpin back down to operational size without removal from the trailer (i.e., "in situ").

Existing lathes for machining kingpins in situ lack the functionality to achieve a desirable surface roughness in the kingpin. For example, U.S. Pat. No. 6,085,623, which is incorporated herein by reference and which was previously granted to the inventor of embodiments herein disclosed, discloses an orbital lathe capable of machining a kingpin in situ. However, the '623 orbital lathe suffered mechanical vibrations that detrimentally affected the surface roughness. The mechanical vibrations were caused on one hand from the fixed positioning of the cutting tool with respect to a centerline of the kingpin and, on another, from an imprecise mechanical fit between elements of the cutting tool mounting arrangement. Because of the precise tolerances involved in machining fifth wheel kingpins, achieving a desired surface roughness is essential.

Therefore, owners of fifth wheels with non-conforming kingpins would benefit from a portable orbital lathe for economical in situ machining of a fifth wheel kingpin where the portable orbital lathe is adjustable so that a desired surface roughness may be effected.

SUMMARY

Accordingly, the inventors have developed an orbital lathe and a method for in situ resurfacing a fifth wheel kingpin. An embodiment of the orbital lathe comprises a support column generally axially aligned with the pin axis of the kingpin. Also disclosed is a cutting tool mounted to the support column for rotation about the pin axis and having a first positioning mechanism for moving the cutting tool at least radially relative to the pin axis, a second positioning mechanism for rotating the cutting tool about a centerline axis generally orthogonal to the pin axis, and a third positioning mechanism for moving the cutting tool parallel to the centerline axis. A drive mechanism for rotating the cutting tool about the pin axis to cause the cutting tool to remove material from the kingpin is also provided. The position of the cutting tool in relation to the centerline axis determines a surface roughness of the kingpin.

In another embodiment, the orbital lathe comprises a support column generally axially aligned with the pin axis of the kingpin and a top surface mounted to the support column for rotation about the pin axis, the top surface further comprising attachment points to slidably position a cutting tool with respect to the centerline of the kingpin to determine a surface roughness of the kingpin when rotation of the top surface causes the cutting tool to remove material from the kingpin.

The method comprises installing a support column of the orbital lathe between a kingpin and an underlying surface, whereby the support column is generally axially aligned with a pin axis of the kingpin. The method also comprises adjusting a cutting tool connected to the support column for rotation about the pin axis and having a first positioning mechanism for moving the cutting tool at least radially relative to the pin axis, a second positioning mechanism for rotating the cutting tool about a centerline axis generally orthogonal to the pin axis, and a third positioning mechanism for moving the cutting tool parallel to the centerline axis by operating the first positioning mechanism to dispose the cutting tool radially relative to the pin axis, operating the second positioning mechanism to dispose the cutting tool about the centerline, operating the third positioning mechanism to dispose the cutting tool parallel to and away from the centerline axis and operating a drive mechanism of the orbital lathe to rotate the cutting tool about the pin thereby achieving a surface roughness of the kingpin by removing material therefrom. The method then further comprises determining whether a desired surface roughness has been achieved, and repeating operating the third positioning mechanism to dispose the cutting tool parallel to and away from the centerline axis and operating a drive mechanism of the orbital lathe to rotate the cutting tool about the pin thereby determining a surface roughness of the kingpin by removing material from the kingpin until the desired surface roughness has been achieved.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not, therefore, to be considered limiting of its scope, the embodiments will be described and explained with additional specificity and detail through the use of the accompanying drawings, in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1:
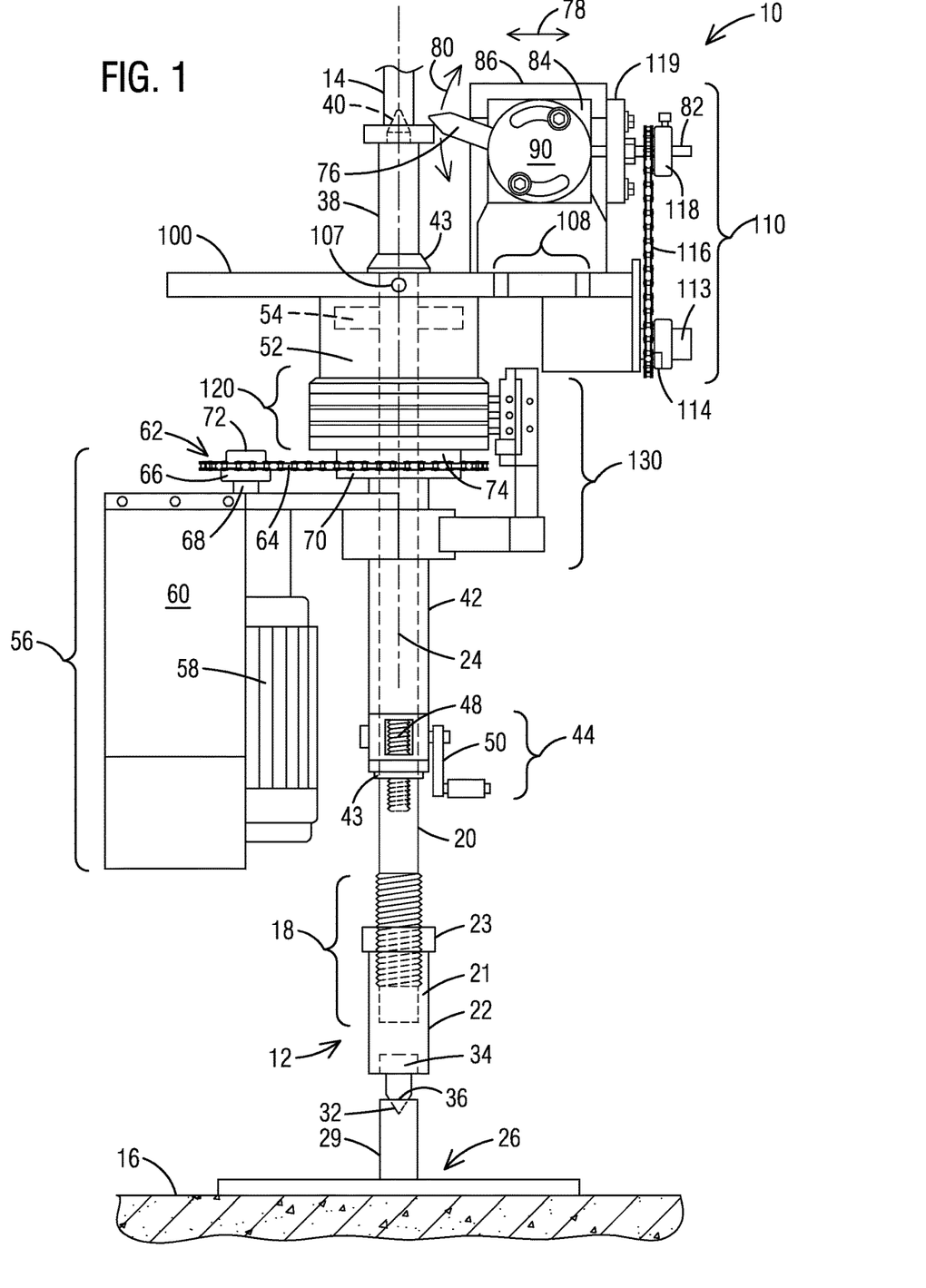
FIG. 1 is a front view of an embodiment of an orbital lathe according to an embodiment disclosed herein.

An embodiment of an orbital lathe is generally identified by reference 10 in FIG. 1. The orbital lathe 10 may include a support column 12 insertable between a fifth wheel kingpin 14 and an underlying surface 16. As a non-limiting example, the underlying surface 16 may be a ground surface or a concrete footing.

The support column 12 may be of adjustable length to enable secure placement. Any suitable telescoping arrangement 18 may be utilized. The support column 12 may be made up of a first part 20 which is threadedly connected to a second part 22. The second part 22 may have a threaded collar 23 welded to its upper end 38 to engage a threaded end 21 of the first part 20. In an embodiment, the threaded end 21 may have a double-start thread arrangement. Relative rotation between the first part 20 and the second part 22 may cause relative axial movement between the first part 20 and second part 22 along a pin axis 24 which may be aligned with the kingpin 14 when the portable lathe 10 is installed.

To accommodate unevenness in the underlying surface 16, a base member 26 may be provided having an upwardly extending tubular part 29. In an embodiment, the tubular part 29 may include an inwardly beveled upper edge 32 to receive a downwardly depending centering plug 34 mounted to the bottom of the second part 22. The centering plug 34 may have a conical projection 36 which registers with the beveled upper edge 32 of the tubular part 29. This enables the first part 20 and second part 22 to be aligned with the pin axis 24 without having to be exactly perpendicular to the underlying surface 16.

Although a conical projection 36 and beveled upper edge 32 are shown, other shapes may be selected such as, but not limited to, the centering plug 34 may be dome-shaped and received in a corresponding curved faced upper edge 32.

In an embodiment, the tubular part 29 may include a space for receiving the support column 12 directly, where the relative axial movement between the first part 20 and the tubular part 29 may be achieved by positioning the threaded collar 23 along the threaded end 21 to abut the tubular part 29.

An upper end 38 of the first part 20 of the support column 12 may be provided with a conical projection 40 which registers with a recess in the bottom of the kingpin 14 to act as a centering means to maintain axial alignment between the kingpin 14 and the support column 12 along the pin axis 24. In another embodiment, the upper end 38 may be removable from the first part 20 of the support column 12 such that replacement of the upper end 38 may be achieved without disassembly of the orbital lathe 10.

A cylindrical sleeve 42 may extend about the first part 20 of the support column 12 toward the upper end 38 of the first part 20. The sleeve 42 may be slidable along the first part 20. A transport mechanism 44 such as, but not limited to, a rack 46 may be secured to the first part 20 and a pinion 48 may be secured to the sleeve 42 which may be provided to move the sleeve 42 along the first part 20 of the support column 12. The transport mechanism 44 may also include a crank 50 for rotating the pinion 48. The rack 46 and pinion 48 arrangement also may prevent relative rotation between the first part 20 and the sleeve 42. Although a rack and pinion arrangement is shown it is expected that alternate transport mechanisms such as, but not limited to, cooperating threads, a hydraulic cylinder, etc., may be substituted.

In order to provide a close tolerance sliding fit between the first part 20 and the sleeve 42, a guide bushing 43 may be threaded into opposite ends of the sleeve 42. The bushing 43 may be made of brass to provide an easily replaced wear component to avoid wear directly between the first part 20 and sleeve 42.

A cylindrical drum 52 may extend about the sleeve 42 toward the upper end 38 of the first part 20 of the support column 12. Suitable bearing such as, but not limited to, tapered bearings 54 may extend between the drum 52 and the sleeve 42 to locate the drum 52 on the sleeve 42 and enable rotation of the drum 52 about the sleeve 42 about the pin axis 24. The cylindrical drum 52 may further have a flat surface and a cylindrical drum surface. In an embodiment, the guide bushing 43 allows for smoother rotation of the cylindrical drum 52 about the pin axis 24, thereby impacting a surface roughness of the kingpin 14.

Figure 3:
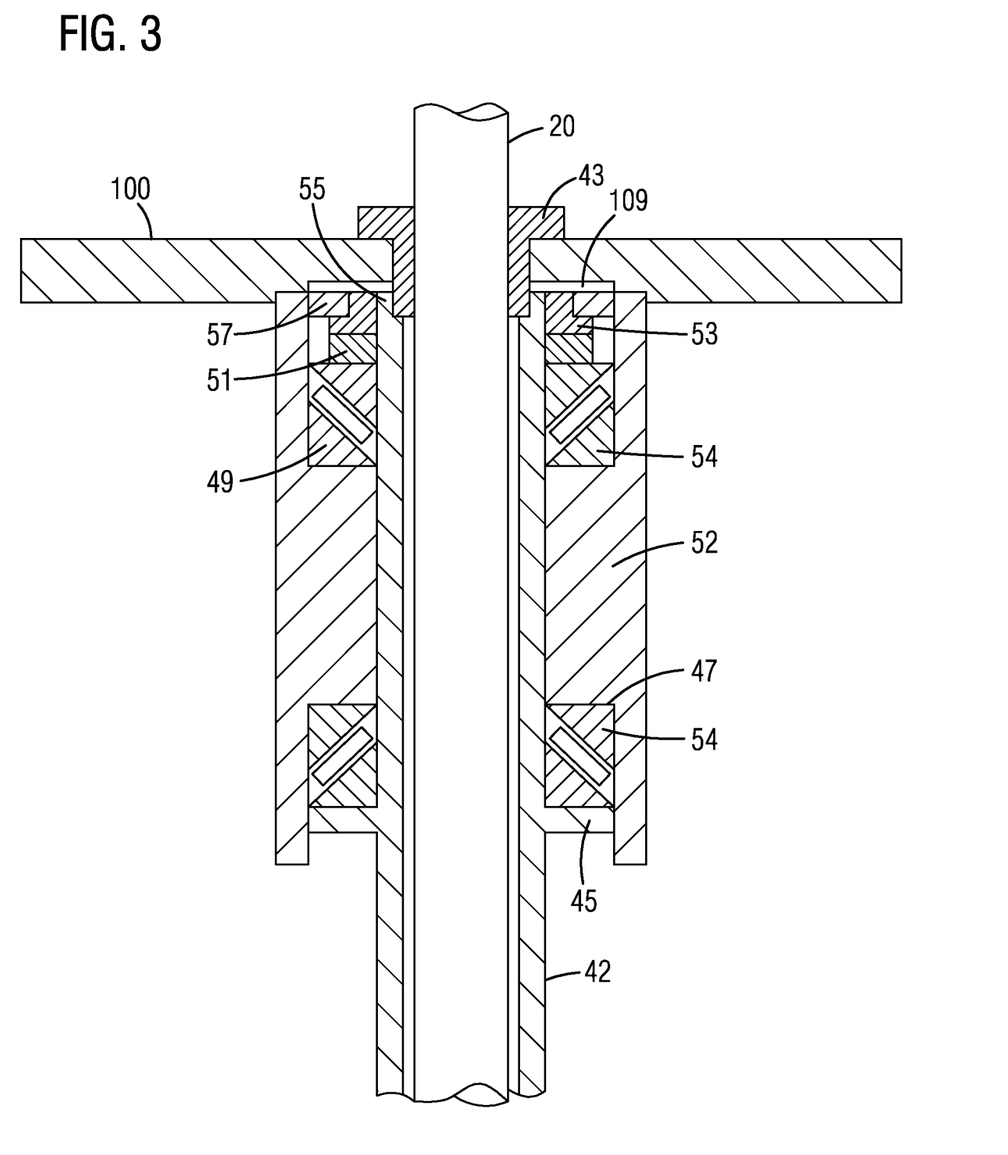
FIG. 3 is a sectional view of an embodiment of the orbital lathe of FIG. 1 showing part of a support column and sleeve according to an embodiment disclosed herein.

As shown in more detail in FIG. 3, the lowermost bearing 54 may be mounted between a flange 45 extending about the sleeve 42 and a lower stepped recess 47 in the drum 52. The uppermost bearing 54 may be mounted between an upper stepped recess 49 in the drum 52 and a nut 51 threadedly engaging the sleeve 42. The nut 51 may allow for adjustment of the crush on the bearings 54. A lock-nut 53 may be provided about the nut 51. The lock-nut 53 may be provided with an upwardly extending cylindrical lip 55 which may accommodate a seal 57 mounted between the sleeve 42 and the drum 52 to prevent cuttings and dirt from entering between the drum 52 and the sleeve 42.

Returning to FIG. 2, a top surface 100 with a topside 101 and an underside 103 may be secured to the cylindrical drum 52 wherein the underside 103 of the top surface 100 may be in surface contact with the flat surface of the cylindrical drum 52. As shown in FIG. 3, the top surface 100 may create a cavity 109 between the underside 103 and at least one of the lock-nut 53, the seal 57, the nut 51, the cylindrical sleeve 42, the upwardly extending cylindrical lip 55, and the cylindrical drum 52 for a fluid to be inserted therebetween, according to an embodiment. The top surface 100 may include a nipple 107 disposed in at least one of the topside 101, the underside 103, or a lateral surface of the top surface 100. The nipple 107 may be in fluid communication with the cavity 109 for the fluid to be inserted therein without having to move the top surface 100 away from the cylindrical drum 52. As will be discussed in more detail below, a cutting tool 76 may be slidably secured to the top surface 100. The cutting tool 76 and the top surface 100 may be rotatable with the drum 52 about the pin axis 24.

Returning to FIG. 2, the mounting arrangement for the cutting tool 76 may include a first positioning mechanism 110 for moving the cutting tool 76 radially relative to the pin axis 24 in the direction of arrows 78, according to an embodiment. The first positioning mechanism 110 may be a threaded rod 82 which may extend through a tool block 84 to which the cutting tool 76 is mounted. The tool block 84 may be slidably received in a support block 86 for alignment. As a non-limiting example, the tool block 84 and support block 86 may have a matching "dovetail" shaped tongue and groove arrangement such as commonly referred to as a "dovetail block."

Figures 6A, 6B:
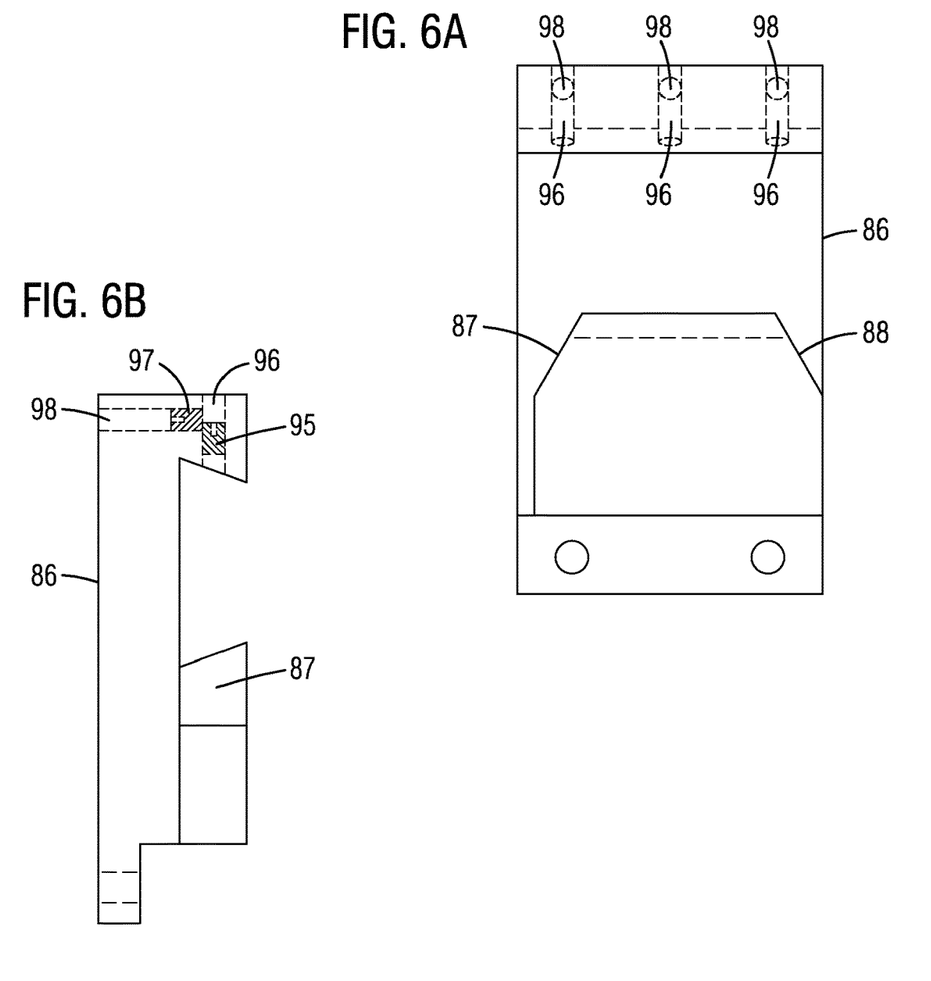
FIG. 6A is a front view of a support block according to an embodiment disclosed herein.
FIG. 6B is a side view of a support block according to an embodiment disclosed herein.

As illustrated in FIG. 6A, the support block 86 may include at least one chip evacuator for directing material removed from the kingpin 14 by the cutting tool 76 away from the kingpin 14, thereby reducing waste material, or chips, from affecting the surface roughness of the kingpin 14. In an embodiment, a first chip evacuator 87 may be located on a distal end of a lower groove of the support block 86, and a second chip evacuator 88 at another distal end of the lower groove of the support block 86.

As further illustrated in FIG. 6B, the support block 86 may include at least one first insert 95 disposed in at least one corresponding first insert aperture 96, and at least one second insert 97 disposed in at least one corresponding second insert aperture 98. The at least one first insert 95 and corresponding first insert aperture 96 may be disposed on a first side of the support block 86 and the at least one second insert 97 and corresponding second insert aperture 98 may be disposed in a second side of the support block 86 generally orthogonal to the first side. In another embodiment, the at least one first insert 95 and corresponding first insert aperture 96, and the at least one second insert 97 and corresponding second insert aperture 98 may be disposed in the same side of support block 86.

The at least one first insert 95 may include a compressible end and a threaded end. The compressible end and the threaded end may be in contact with each other, but may also be arranged so that contact does not exist. The at least one second may include a rigid end and a threaded end where the rigid end and the threaded end are in contact with each other, but may also be arranged so that contact does not exist. In an embodiment, the at least one first insert 95 is in contact with a wedge gib 89 disposed between an upper groove of the support block 86 and an upper protrusion of the tool block 84. The at least one second insert 97 may be in contact with the at least one first insert 95 thereby dampening vibrations generated by the cutting tool 76 as it removes material from the kingpin 14.

Returning to FIG. 2, the first positioning mechanism 110 may comprise a first motor 112 mounted to an underside 103 of the top surface 100. A drive sprocket 114 may be connected to a first output shaft 113 of the first motor 112 driving a driven sprocket 118 through a chain 116. The driven sprocket 118 may be secured to a free end of the threaded rod 82. The threaded rod 82 may be attached to the support block 86 by a rod support bracket 119. As it may be appreciated by those skilled in the art, the non-limiting first positioning mechanism 110, as described herein, may be achieved in different variations, for instance, with a belt and pulley system, a linear motor system, or manually with a hand operated system having a knob attached to the free end of the threaded rod 82.

Figure 2:
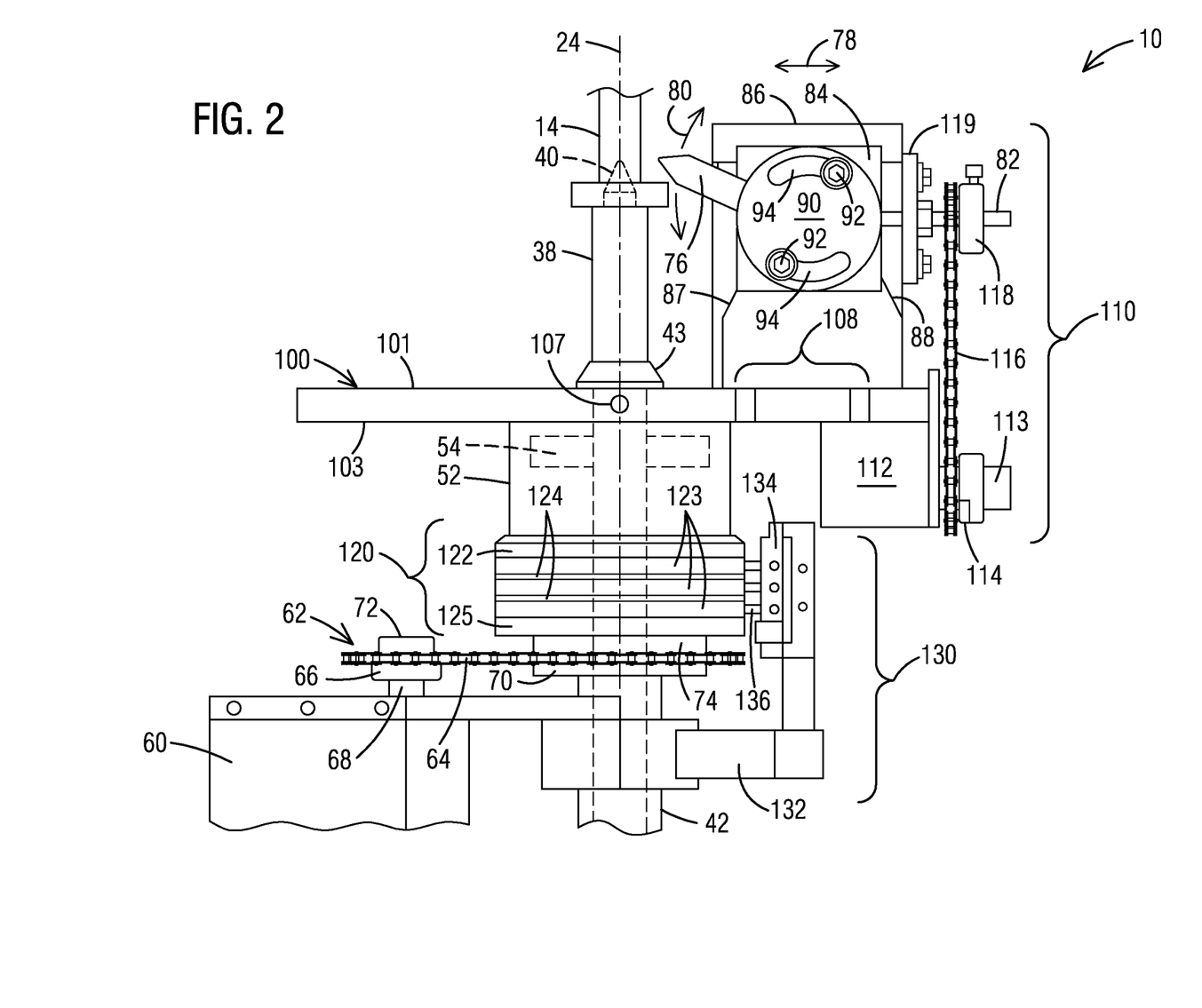
FIG. 2 is a front perspective detail view of an embodiment of the orbital lathe shown in FIG. 1 according to an embodiment disclosed herein.

The orbital lathe 10 may further comprise a contact assembly 120 and a brush assembly 130. The contact assembly 120 may be disposed around and secured to the cylindrical drum 52 to create a uniform surface. The contact assembly 120 may comprise at least two electrical contacts 123 separated by at least one intermediate insulating spacer 124 between each of the electrical contacts 123. The contact assembly 120 may further comprise at least one uppermost insulating spacer 122 above an electrical contact 123 and at least one lowermost insulating spacer 125 below an electrical contact 123. Each of the at least two electrical contacts 123 may be electrically connected to the first motor 112.

The brush assembly 130 may comprise a brush support bracket 132 attached to the cylindrical sleeve 42 enabling the brush assembly 130 to remain in a fixed position with respect to the rotation of the cylindrical drum 52. The brush assembly 130 may comprise at least two electrical brushes 136 mounted on a brush block 134, each of the at least two electrical brushes 136 in continuous electrical and mechanical contact with a corresponding electrical contact 123 of the at least two electrical contacts 123. In an embodiment, the at least two electrical brushes 136 may be biased by a spring mechanism contained within the brush block 134 to maintain constant contact between an electrical brush 136 and a corresponding electrical contact 123. Each of the electrical brushes 136 may be electrically connected to a controllable power source to enable electrical control of the first motor 112 as the cutting tool 76 rotates about the pin axis 24. The controllable power source may be a direct-current (DC) or alternative-current (AC) power source.

In yet another embodiment, the controllable electrical power source may be a battery system mounted to either the motor 112, the surface 100, or the cylindrical drum 52 and electrically connected to the motor 112. The battery powered—controllable electrical power source may be controlled by a radio transceiver system in communication with a wireless controller whereby a user of the orbital lathe 10 may operate the motor 112 while the cutting tool 76 rotates about the pin axis 24 without interruption. The wireless controller may be a dedicated device or a mobile device capable of wireless transmission.

The mounting arrangement for the cutting tool 76 may further comprise a second positioning mechanism enabling rotation of the cutting tool 76 about an axis orthogonal to the pin axis 24 in the direction of arrows 80. The cutting tool 76 may be secured to a tool holder 90 which in turn may be secured to the tool block 84 by hex screws 92. Curved slots 94 may be provided in the tool holder 90 which may act in conjunction with the hex screws 92 as the second positioning mechanism to allow rotation of the cutting tool 76 in the direction of arrows 80 in FIG. 1. Rotation of the cutting tool 76 above and below a generally horizontal axis may be desirable to enable cutting of both an upper and a lower radius on the kingpin 14. In an embodiment, the cutting tool 76 may be rotatable to a generally vertical position should it prove necessary to cut the weld securing the kingpin 14 to the trailer in the event that kingpin 14 replacement, rather than resurfacing, should prove necessary.

Figure 4A:
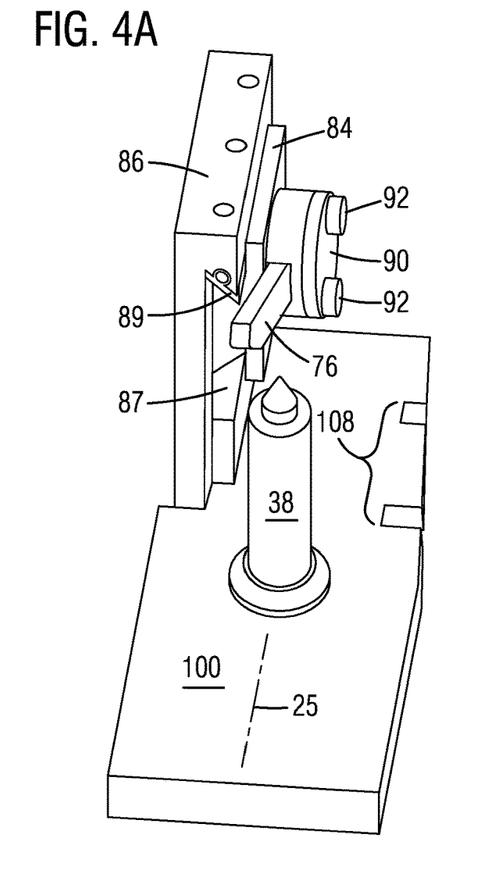
FIGS. 4A-4B are perspective views of a top surface with and without a cutting tool, support block, and upper end according to an embodiment disclosed herein.
Figure 4B:
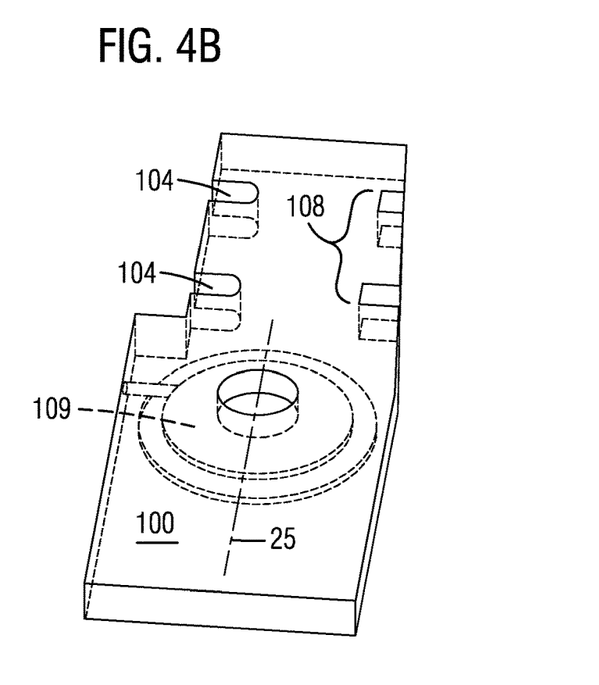

As shown in FIGS. 4A and 4B, the mounting arrangement for the cutting tool 76 may also include a third positioning mechanism enabling the cutting tool 76 to move parallel to a centerline 25 of the kingpin 14. In an embodiment, the centerline 25 intersects and is orthogonal to the pin axis 24.

Figure 5:
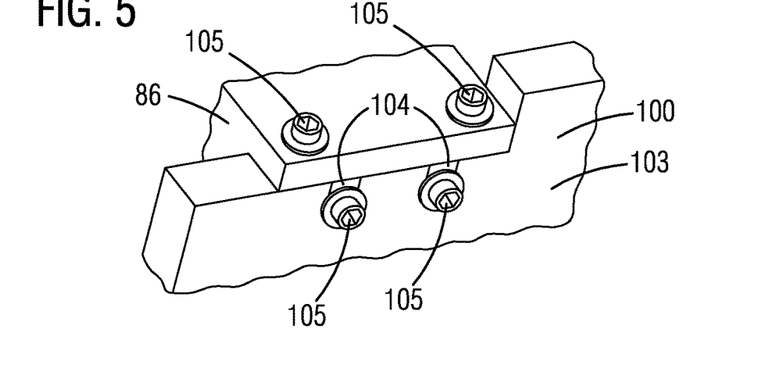
FIG. 5 is a bottom view of a top surface with a support block according to an embodiment disclosed herein.

As shown in FIG. 5, the support block 86 may be secured to the top surface 100 by bolts 105 positioned through slotted mounting holes 104 of the top surface 100. The slotted mounting holes 104 may allow the operator to move the cutting tool 76 to a position parallel to the centerline 25 when the bolts 105 have been loosened. When the bolts 105 are tightened the cutting tool 76 may be secured in the position parallel to the centerline 25.

As FIG. 2 and FIG. 4B illustrate, the top surface 100 may include a gauge or a standard 108 that indicates an acceptable shank width measurement of kingpin 14. The gauge or standard 108 may comprise indentations such as, but not limited to, parallel indentations where each indentation has parallel sides. A specific width between the inner parallel sides of each indentation may represent an acceptable shank width measurement. In a non-limiting embodiment, a specific width may be 2.875 inches (7.3025 centimeters).

Figure 7A:
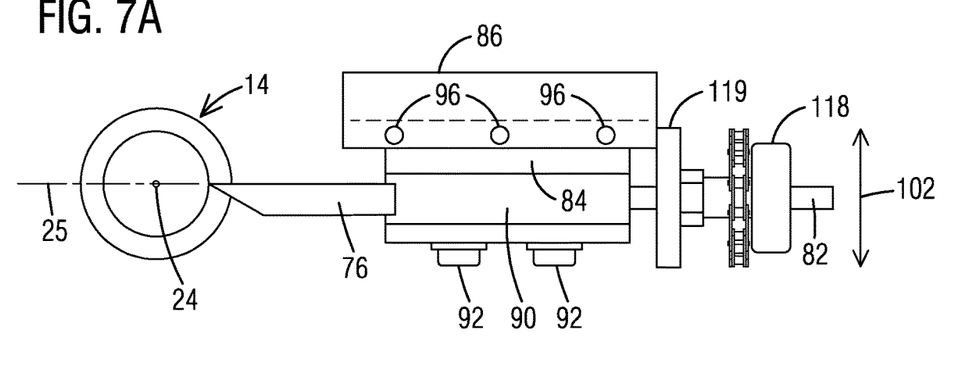
FIGS. 7A-7C are top detail views of the cutting tool in different positions with respect to a centerline of a kingpin according to an embodiment disclosed herein; and, FIG. 8 is a flow chart that illustrates an embodiment of a method to machine a kingpin to a desired surface roughness.
Figure 7B:
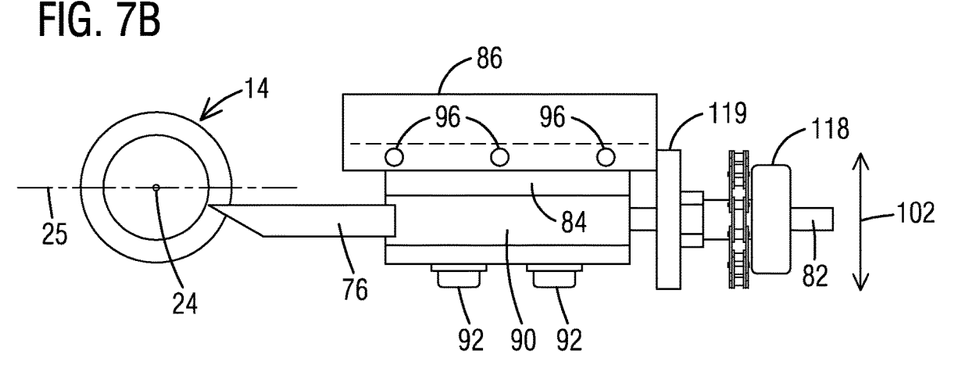
Figure 7C:
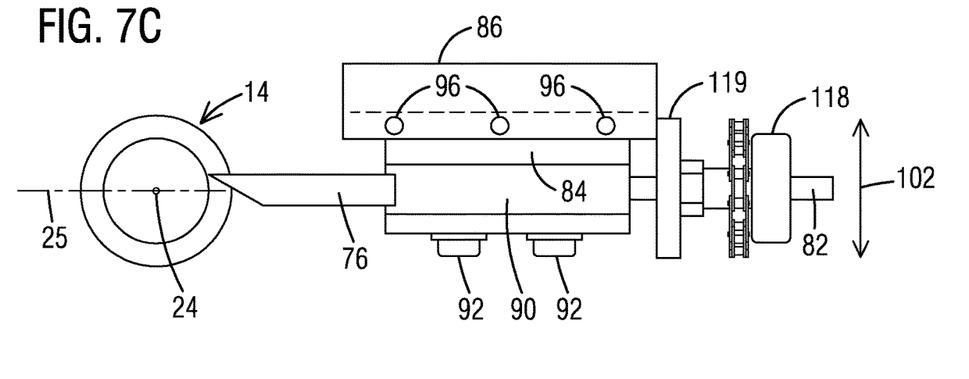

Continuing to FIG. 7A, the cutting tool 76 may be placed in alignment with the centerline 25 by moving the support block 86 along the slotted mounting holes 104. Similarly, in FIG. 7B, the cutting tool 76 may be placed in a position parallel to the centerline 25, but where the cutting tool 76 lags the centerline 25 as the cutting tool 76 rotates about the pin axis 24. FIG. 7C illustrates the cutting tool 76 placed in a position parallel to the centerline 25, but where the cutting tool 76 leads the centerline 25 as the cutting tool 76 rotates about the pin axis 24. In an embodiment, the position of the cutting tool 76 to the centerline 25 of kingpin 14 may determine the surface roughness of the kingpin 14 as material is removed by the cutting tool 76.

Drive mechanism 56 may cause the drum 52 to rotate about the sleeve 42. The drive mechanism may include a second motor 58 secured to a mounting bracket 60 which is rigidly secured to and extends from the sleeve 42. The drive mechanism 56 may further include a rotational coupling 62, comprising a drive belt 64 extending about a drive pulley 66 secured to a second output shaft 68 of the second motor 58 and a driven pulley 70 extending about or secured to the drum 52. The rotational coupling 62 may cause the drum 52 to rotate about the sleeve 42 in response to rotational input from the second motor 58. Additional drive and driven pulleys of different diameters such as illustrated by references 72 and 74 respectively may be provided to enable various rotational speeds to be selected for the drum 52. As it may be appreciated by those skilled in the art, the non-limiting drive mechanism, as described herein, may be achieved in different variations, for instance, a belt and pulley system or a hand crank system.

Figure 8:
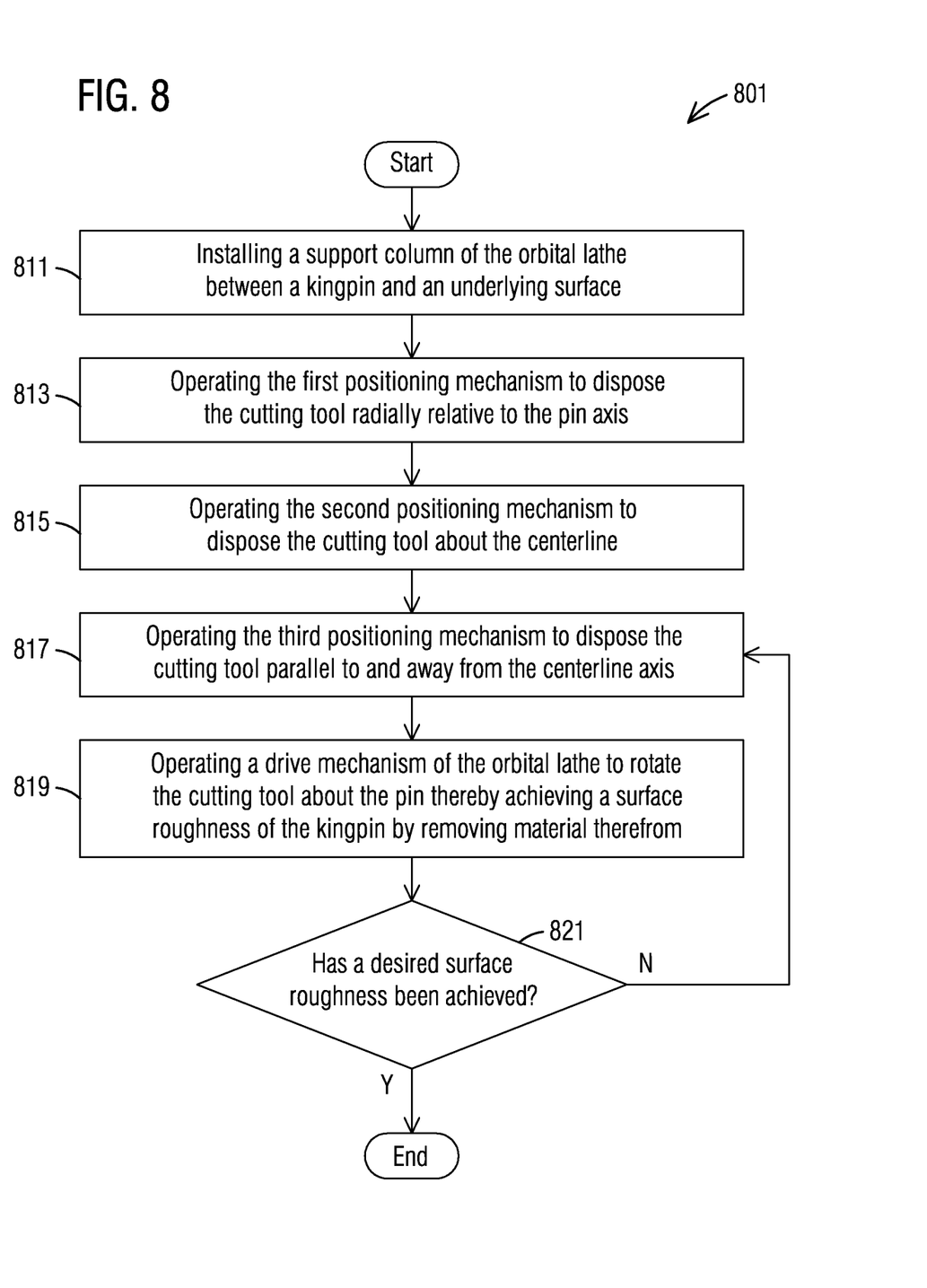

FIG. 8 illustrates a flow chart of an embodiment of a method 801 to machine a kingpin 14 to a desired surface roughness. Although steps are depicted in FIG. 8 as integral steps in a particular order for purposes of illustration, in other embodiments, one or more steps, or portions thereof, are performed in a different order, or overlapping in time, or are omitted, or one or more additional steps are added, or the method is changed in some combination of ways.

In step 811, the support column 12 of the orbital lathe 10 is installed between the kingpin 14 and an underlying surface 16 so that the support column 12 is generally axially aligned with the pin axis 24 of the kingpin 14. In steps 813, 815, and 817, the cutting tool 76 is adjusted with respect to the kingpin 14. Specifically, in step 813, the first positioning mechanism 110 is operated to dispose the cutting tool 76 radially relative to the pin axis 24 in the direction of arrows 78. In step 815, the second positioning mechanism is operated to dispose the cutting tool 76 about the centerline 25 in the direction of arrows 80. Then, in step 817, the third positioning mechanism is operated to dispose the cutting tool 76 parallel to and away from the centerline axis 25 in the direction of arrows 102.

A surface roughness of the kingpin 14 is achieved in step 819 by operating a drive mechanism 56 of the orbital lathe 10 to rotate the cutting tool 76 about the kingpin 14 to remove material therefrom. In step 821, it is determined whether a desired surface roughness of the kingpin 14 has been achieved. If so, the method 801 is concluded. If not, steps 817, 819, and 821 are repeated until a desired surface roughness is achieved.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed is:

1. An orbital lathe for in situ resurfacing a fifth wheel kingpin, having a pin axis, the orbital lathe comprising:
   a support column axially aligned with the pin axis of the kingpin;
   a cutting tool mounted to the support column for rotation about the pin axis and having a first positioning mechanism for moving the cutting tool at least radially relative to the pin axis, a second positioning mechanism for rotating the cutting tool about a centerline axis orthogonal to the pin axis, and a third positioning mechanism for moving the cutting tool parallel to the centerline axis; and
   a drive mechanism for rotating the cutting tool about the pin axis to cause the cutting tool to remove material from the kingpin;
   wherein the position of the cutting tool in relation to the centerline axis provides a desired surface roughness of the kingpin; and
   wherein the cutting tool comprises a support block and a tool block in sliding engagement with each other, the support block further comprising at least one first insert and at least one second insert, the at least one first insert in contact with the tool block and the at least one second insert in contact with the at least one first insert, to dampen a vibration when the cutting tool removes material from the kingpin.

2. The orbital lathe of claim 1, wherein the cutting tool comprises a support block having at least one chip evacuator to direct the material removed from the kingpin away from the kingpin.

3. The orbital lathe of claim 1, wherein the at least first insert includes a compressible end and a threaded end and the at least one second insert includes a rigid end and a threaded end.

4. The orbital lathe of claim 1, wherein the at least one first insert and the at least one second insert are disposed generally orthogonal to each other within the support block.

5. The orbital lathe of claim 1, further comprising a cylindrical drum disposed around the support column and attached to the cutting tool, the cylindrical drum having a cylindrical drum surface, a contact assembly with at least two electrical contacts radially disposed around the cylindrical drum and each of the at least two electrical contacts insulated by at least one intermediate insulating spacer radially disposed around the cylindrical drum, each of the at least two electrical contacts and of the at least one insulating spacer forming a uniform surface to define a width away from the cylindrical drum surface, the electrical contacts electrically connected to the drive mechanism.

6. The orbital lathe of claim 5, further comprising:
   a mounting bracket; and
   a brush assembly secured to the support column by the mounting bracket;
   wherein the brush assembly comprising at least two electrical brushes in contact with the at least two electrical contacts, the electrical brushes electrically connected to a controllable power source.

7. The orbital lathe of claim 5, wherein the cylindrical drum is attached to the cutting tool by a top surface.

8. The orbital lathe of claim 7, wherein the top surface and the cylindrical drum create a cavity, the top surface further comprises a nipple in fluid connection with the cavity.

9. The orbital lathe of claim 7, wherein the top surface further comprises a standard for referencing an acceptable width of a shank of the kingpin.

10. An orbital lathe for in situ resurfacing a fifth wheel kingpin, having a pin axis, the orbital lathe comprising:
    a support column axially aligned with the pin axis of the kingpin;
    a cutting tool mounted to the support column for rotation about the pin axis and having a first positioning mechanism for moving the cutting tool at least radially relative to the pin axis, a second positioning mechanism for rotating the cutting tool about a centerline axis orthogonal to the pin axis, and a third positioning mechanism for moving the cutting tool parallel to the centerline axis;
    a drive mechanism for rotating the cutting tool about the pin axis to cause the cutting tool to remove material from the kingpin; and
    a cylindrical drum disposed around the support column and attached to the cutting tool, the cylindrical drum having a cylindrical drum surface, a contact assembly with at least two electrical contacts radially disposed around the cylindrical drum and each of the at least two electrical contacts insulated by at least one intermediate insulating spacer radially disposed around the cylindrical drum, each of the at least two electrical contacts and of the at least one insulating spacer forming a uniform surface to define a width away from the cylindrical drum surface, the electrical contacts electrically connected to the drive mechanism;
    wherein the position of the cutting tool in relation to the centerline axis provides a desired surface roughness of the kingpin.

11. The orbital lathe of claim 10, further comprising:
    a mounting bracket; and
    a brush assembly secured to the support column by the mounting bracket;
    wherein the brush assembly comprising at least two electrical brushes in contact with the at least two electrical contacts, the electrical brushes electrically connected to a controllable power source.

12. The orbital lathe of claim 10, wherein the cylindrical drum is attached to the cutting tool by a top surface.

13. The orbital lathe of claim 12, wherein the top surface and the cylindrical drum create a cavity, the top surface further comprises a nipple in fluid connection with the cavity.

14. The orbital lathe of claim 12, wherein the top surface further comprises a standard for referencing an acceptable width of a shank of the kingpin.

15. The orbital lathe of claim 10, wherein the cutting tool comprises a support block having at least one chip evacuator to direct the material removed from the kingpin away from the kingpin.

16. The orbital lathe of claim 10, further wherein the cutting tool comprises a support block and a tool block in sliding engagement with each other, the support block further comprising at least one first insert and at least one second insert, the at least one first insert in contact with the tool block and the at least one second insert in contact with the at least one first insert, to dampen a vibration when the cutting tool removes material from the kingpin.

17. The orbital lathe of claim 16, wherein the at least first insert includes a compressible end and a threaded end and the at least one second insert includes a rigid end and a threaded end.

18. The orbital lathe of claim 16, wherein the at least one first insert and the at least one second insert are disposed generally orthogonal to each other within the support block.

19. A method for machining a kingpin with an orbital lathe, the method comprising:
- installing a support column of the orbital lathe between a kingpin and an underlying surface, whereby the support column is axially aligned with a pin axis of the kingpin;
- adjusting a cutting tool connected to the support column for rotation about the pin axis and having a first positioning mechanism for moving the cutting tool at least radially relative to the pin axis, a second positioning mechanism for rotating the cutting tool about a centerline axis orthogonal to the pin axis, and a third positioning mechanism for moving the cutting tool parallel to the centerline axis by,
- operating the first positioning mechanism to dispose the cutting tool radially relative to the pin axis;
- operating the second positioning mechanism to dispose the cutting tool about the centerline;
- operating the third positioning mechanism to dispose the cutting tool parallel to and away from the centerline axis; and
- operating a drive mechanism of the orbital lathe to rotate the cutting tool about the pin thereby achieving a desired surface roughness of the kingpin by removing material therefrom;
- determining whether the desired surface roughness has been achieved; and
- repeating operating the third positioning mechanism to dispose the cutting tool parallel to and away from the centerline axis and operating a drive mechanism of the orbital lathe to rotate the cutting tool about the pin thereby determining the surface roughness of the kingpin by removing material from the kingpin until the desired surface roughness has been achieved.

* * * * *